United States Patent
Adrangi et al.

(10) Patent No.: US 7,580,396 B2
(45) Date of Patent: Aug. 25, 2009

(54) METHOD, APPARATUS AND SYSTEM FOR OBTAINING AND RETAINING A MOBILE NODE HOME ADDRESS

(75) Inventors: Farid Adrangi, Lake Oswego, OR (US); Ranjit S. Narjala, Hillsboro, OR (US); Michael B. Andrews, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1083 days.

(21) Appl. No.: 10/702,865

(22) Filed: Nov. 5, 2003

(65) Prior Publication Data

US 2005/0094606 A1    May 5, 2005

(51) Int. Cl.
*H04Q 7/24*    (2006.01)
(52) U.S. Cl. ............... 370/338; 370/328; 455/456.1
(58) Field of Classification Search ............... None
See application file for complete search history.

(56) References Cited

U.S. PATENT DOCUMENTS

| | | | |
|---|---|---|---|
| 6,160,804 A | 12/2000 | Ahmed et al. | |
| 6,167,513 A | 12/2000 | Inoue et al. | |
| 6,168,513 B1 | 1/2001 | Souza et al. | |
| 6,321,090 B1 | 11/2001 | Soliman | |
| 6,366,961 B1 | 4/2002 | Subbiah et al. | |
| 6,400,722 B1 | 6/2002 | Chuah et al. | |
| 6,421,714 B1 | 7/2002 | Rai et al. | |
| 6,430,698 B1 * | 8/2002 | Khalil et al. | 714/4 |
| 6,445,922 B1 | 9/2002 | Hiller et al. | |
| 6,496,704 B2 | 12/2002 | Yuan | |
| 6,510,153 B1 * | 1/2003 | Inoue et al. | 370/354 |
| 6,535,493 B1 * | 3/2003 | Lee et al. | 370/329 |

(Continued)

FOREIGN PATENT DOCUMENTS

EP    1284559 A2    2/2003

(Continued)

OTHER PUBLICATIONS

Chen, Yu, et al., "Dynamic Home Agent Reassignment in Mobile IP", WCNC, IEEE Wireless Communications and Networking Conference, vol. 1, Mar. 17, 2002, XP000864173, (pp. 44-48).

(Continued)

*Primary Examiner*—Bob A Phunkulh
(74) *Attorney, Agent, or Firm*—Sharmini N. Green

(57) ABSTRACT

A method, apparatus and system which enable a mobile node to request dynamic allocation of a home address and to maintain that home address when roaming between a home subnet and a foreign subnet. According to one embodiment, the mobile node may acquire a home address from its home agent by using a Network Access Identifier ("NAI") extension in a registration request. The mobile node may send out this registration request when it first starts up, regardless of whether it is on its home subnet or a foreign subnet. Additionally, the mobile node may set a bit in the registration request to inform the home agent that it is on its home network. If the bit is not set, the home agent may deduce that the mobile node is on a foreign network. In either instance, the mobile node may continue to use its originally acquired home address.

13 Claims, 2 Drawing Sheets

U.S. PATENT DOCUMENTS

| | | |
|---|---|---|
| 6,567,664 B1 | 5/2003 | Bergenwall et al. |
| 6,571,289 B1 | 5/2003 | Montenegro |
| 6,614,774 B1 | 9/2003 | Wang |
| 6,621,810 B1 * | 9/2003 | Leung ................... 370/338 |
| 6,636,498 B1 * | 10/2003 | Leung ................... 370/338 |
| 6,690,659 B1 | 2/2004 | Ahmed et al. |
| 6,795,701 B1 | 9/2004 | Baker et al. |
| 6,829,480 B1 | 12/2004 | Hoglund et al. |
| 6,856,624 B2 | 2/2005 | Magret |
| 6,904,466 B1 | 6/2005 | Ishiyama et al. |
| 6,934,274 B2 * | 8/2005 | Inoue et al. ............. 370/338 |
| 6,970,943 B1 | 11/2005 | Subramanian et al. |
| 6,973,057 B1 | 12/2005 | Forslow |
| 6,988,146 B1 * | 1/2006 | Magret et al. ............ 709/238 |
| 6,999,437 B2 | 2/2006 | Krishnamurthi et al. |
| 7,020,120 B2 * | 3/2006 | Inoue et al. ............. 370/338 |
| 7,047,561 B1 | 5/2006 | Lee |
| 7,058,728 B1 | 6/2006 | Eklund |
| 7,079,499 B1 | 7/2006 | Akhtar et al. |
| 7,079,520 B2 * | 7/2006 | Feige et al. ............. 370/338 |
| 7,082,476 B1 | 7/2006 | Cohen et al. |
| 7,096,273 B1 | 8/2006 | Meier |
| 7,107,620 B2 | 9/2006 | Haverinen et al. |
| 7,116,654 B2 | 10/2006 | Kim |
| 7,120,131 B2 | 10/2006 | Seppala et al. |
| 7,130,629 B1 * | 10/2006 | Leung et al. ............. 455/435.1 |
| 7,149,219 B2 | 12/2006 | Donahue |
| 7,243,141 B2 | 7/2007 | Harris |
| 2002/0022486 A1 | 2/2002 | Chen |
| 2002/0059452 A1 | 5/2002 | Yokota et al. |
| 2003/0142650 A1 | 7/2003 | Fan |
| 2003/0224788 A1 | 12/2003 | Leung et al. |
| 2003/0224855 A1 | 12/2003 | Cunningham |
| 2004/0037260 A1 | 2/2004 | Kakemizu et al. |
| 2004/0047348 A1 | 3/2004 | O'Neill |
| 2004/0090942 A1 | 5/2004 | Flinck |
| 2004/0137888 A1 | 7/2004 | Ohki |
| 2004/0203765 A1 | 10/2004 | Das et al. |
| 2004/0264414 A1 | 12/2004 | Dorenbosch |
| 2005/0009520 A1 | 1/2005 | Herrero et al. |
| 2005/0265363 A1 | 12/2005 | Chen |
| 2006/0013170 A1 | 1/2006 | Shin et al. |
| 2006/0018296 A1 | 1/2006 | Muraoka et al. |
| 2006/0111102 A1 | 5/2006 | O'Neill |
| 2006/0126659 A1 | 6/2006 | Baum et al. |
| 2006/0190586 A1 | 8/2006 | Stewart et al. |
| 2007/0025366 A1 | 2/2007 | Shahrier et al. |
| 2007/0058642 A1 | 3/2007 | Eisink |

FOREIGN PATENT DOCUMENTS

| | | |
|---|---|---|
| GB | 2366483 | 3/2002 |
| JP | 10013712 | 1/1998 |
| WO | WO-02/32159 A2 | 4/2002 |

OTHER PUBLICATIONS

Perkins, Charles E., "IP Mobility Support for IPv4", RFC-3344, Aug. 2002, Internet document at ftp://ftp.rfc-editor.org/in-notes/rfc3344.txt, (pp. 1-114).

Snoeren, Alex C., et al., "An End-to-End Approach to Host Mobility", MobiCom 2000, Aug. 2000, Boston, MA, XP-002286278, (12 pages)

Zheng, Rong et al., "A Case for Mobility Support With Temporary Home Agents", IEEE Publications, Oct. 15, 2001, XP-010562099, (pp. 226-233).

Non-Final Office Action (dated Feb. 20, 2008), U.S. Appl. No. 10/723,916 - Filing Date Nov. 25, 2003, First Named Inventor: Ranjit S. Narjala, (16 pages).

Non-Final Office Action (dated Apr. 15, 2008), U.S. Appl. No. 10/728,553 - Filing Date Dec. 4, 2003, First Named Inventor: Farid Adrangi, (10 pages).

Non-Final Office Action (dated Apr. 24, 2008), U.S. Appl. No. 10/401,896 - Filing Date Mat. 28, 2003, First Named Inventor: Farid Adrangi, (14 pages).

* cited by examiner

METHOD, APPARATUS AND SYSTEM FOR OBTAINING AND RETAINING A MOBILE NODE HOME ADDRESS

FIELD

The present invention relates to the field of mobile computing, and, more particularly to a method, apparatus and system for enabling a mobile node to dynamically obtain a home address and to retain the home address while roaming between its home subnet and foreign subnets.

BACKGROUND

Use of mobile computing devices (hereafter "mobile nodes") such as laptops, notebook computers, personal digital assistants ("TDAs") and cellular telephones is becoming increasingly popular today. These mobile nodes enable users to move from one location to another ("roam"), while continuing to maintain their connectivity to the same network. Given its increasing popularity, it is unsurprising that most corporate ("enterprise") networks today attempt to facilitate fast and secure mobile computing.

In order to roam freely, networks typically conform to one or more industry-wide mobile IP standards. More specifically, the Internet Engineering Task Force ("IETF") has promulgated roaming standards (Mobile IPv4, IETF RFC 3344, August 2002, hereafter "Mobile IPv4," and Mobile IPv6, IETF Mobile IPv6, Internet Draft draft-ietf-mobileip-ipv6-24.txt (Work In Progress), June 2003, hereafter "Mobile IPv6") to enable mobile node users to move from one location to another while continuing to maintain their connectivity to the same network.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for mobile nodes to dynamically discover configuration information while roaming. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
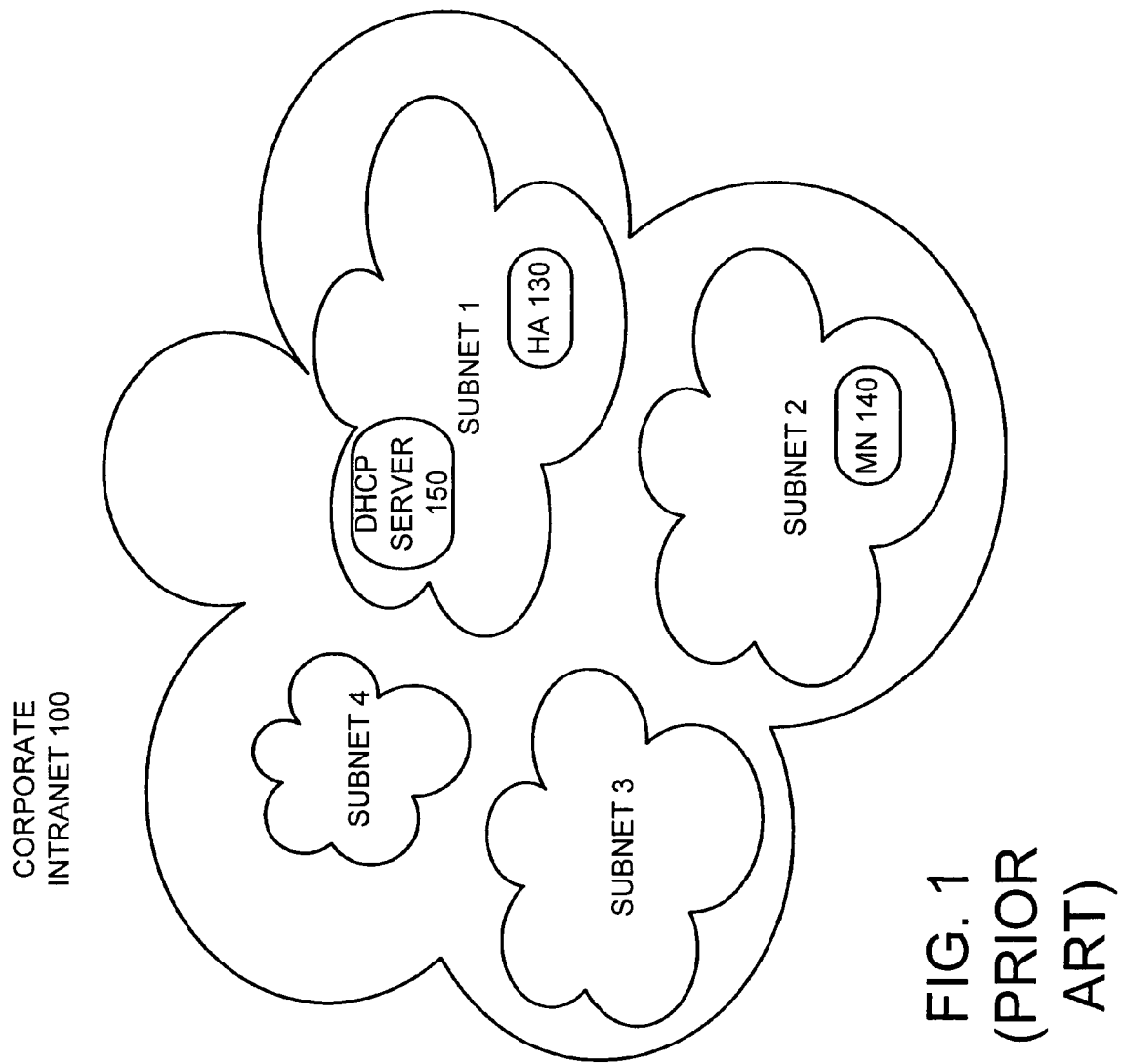
FIG. 1 illustrates a known corporate intranet structure.

FIG. 1 illustrates a known corporate intranet ("Corporate Intranet 100") structure. Corporate Intranet 100 may include both wired and wireless networks and may comprise multiple subnets. Typically, an organization's network is comprised of one or more subnets. A subnet refers to a portion of an organization's network interconnected to other subnets by a routing element. Subnets are well known to those of ordinary skill in the art and further description thereof is omitted herein.

Mobile nodes that conform to Mobile IPv4 standards today may roam freely across subnets within Corporate Intranet 100. Thus, for example, when a mobile node ("MN 140") exits its home subnet, it may continue to maintain its current transport connections and constant reachability by registering with a home agent ("HA 130"). During the registration process, MN 140 informs HA 130 of MN 140's home address (i.e., the invariant address assigned to MN 140) and its "care-of address" (hereafter "COA"), namely MN 140's address on its new subnet. MN 140 may obtain COAs via Dynamic Host Configuration Protocol ("DHCP") or other similar protocols. Immediately after the registration process completes, HA 130 may broadcast a series of unsolicited ARP packets on behalf of MN 140 (hereafter referred to as "gratuitous ARPing"). HA 130 may also respond to ARP requests targeted to MN 140 (hereafter referred to as "proxy ARPing"). Both gratuitous ARPing and proxy ARPing have the effect of causing traffic addressed to MN 140 to be delivered to HA 130. HA 130 thereafter intercepts all IP packets addressed to MN 140 and reroutes the packets to MN 140's COA using IP tunneling. IP tunneling is well known to those of ordinary skill in the art and further description thereof is omitted. As MN 140 moves from one foreign subnet to another, to ensure that HA 130 is able to properly route packets to MN 140, MN 140 must continuously update HA 130 with its new COA. If MN 140 moves to its home subnet, it deregisters with HA 130, causing HA 130 to cease performing the proxy ARP and IP tunneling functions.

As previously described, in order for MN 140 to register with HA 130, it typically provides HA 130 with an invariant home address that uniquely identifies it to HA 130. In other words, HA 130 requires both a home address and a COA for MN 140 in order to properly perform IP tunneling. Typically, home addresses are assigned statically to mobile nodes, e.g., by a system administrator on Corporate Intranet 100. A proposed IETF solution (IETF RFC 2794, March 2000, hereafter referred to as "RFC 2794") enables MN 140 to acquire a home address dynamically by using a NAI extension. More specifically, when MN 140 first attaches to a foreign subnet (i.e., when it exits its home subnet or starts up on a foreign subnet), it sends a registration request to HA 130 to register its COA; the registration request may also include a NAI extension requesting a home address assignment. HA 130 may dynamically assign a home address to MN 140 from a pool of addresses maintained by HA 130, or acquire a home address on behalf of MN 140 from a DHCP server ("DHCP Server 150") on Corporate Intranet 100. HA 130 may return the home address to MN 140 via a registration reply and MN 140 may thereafter utilize this home address in subsequent registration requests each time it moves within the network.

RFC 2794 includes several shortcomings. Specifically, RFC 2794 does not address the situation when initially MN 140 starts up on its home subnet. Since the methodology described in RFCs 2794 and 3344 to acquire a home address do not allow MN 140 to register with HA 130 until it exits its home subnet, MN 140 has no way of obtaining a home address when it starts on its home subnet. Additionally, according to RFC 2794, MN 140 must deregister when it roams back to its home subnet. Even assuming MN 140 does obtain a home address for use, the deregistration process in RFC 2794 effectively releases MN 140's home address back to HA 130's address pool or back to DHCP Server 150. More specifically, HA 130 removes all bindings for MN 140 in its binding table and may release MN 140's home address, making MN 140's home address available for assignment to other mobile nodes. Concurrently, MN 140 may continue to use its home address on its home subnet, possibly leading to an address conflict if its home address was subsequently reassigned to another mobile node.

Embodiments of the present invention alleviate the shortcomings of RFC 2794 by enabling MN 140 to dynamically acquire and retain a home address regardless of whether it starts up on its home subnet or a foreign subnet, and regardless of whether it subsequently moves from a foreign subnet to its home subnet. In one embodiment, MN 140 may be configured to register with HA 130 regardless of whether it is on its home subnet or on a foreign subnet. When it initially starts up, MN 140 may send a NAI extension with its registration request, and HA 130 may assign MN 140 a home address from its local pool of addresses or obtain a home address for MN 140 from DHCP Server 150. This initial registration on its home subnet addresses one of MN 140's problems, namely that of obtaining a home address dynamically while starting operation on its home subnet.

Additionally, according to an embodiment of the present invention, MN 140 may also be configured to inform HA 130 whether MN 140 is on its home subnet or on a foreign subnet. The registration request process as described in RFC 2794 currently includes various reserved bits that are not utilized. In one embodiment, MN 140 may set one of the reserved bits (hereafter referred to as the "OnHomeSubnet" bit) to a predetermined value to enable HA 130 to determine whether MN 140 is on its home subnet or on a foreign subnet. In one embodiment MN 140 may leave the OnHomeSubnet bit unchanged (i.e., at zero) when it is on a foreign subnet and set the bit to one when it is on its home subnet. MN 140 may then send the registration request to HA 130. When HA 130 receives the registration request, it may examine the OnHomeSubnet bit, and upon identifying whether the bit is set to one, determine whether MN 140 is on its home subnet or on a foreign subnet.

HA 130 may utilize the information obtained from the OnHomeSubnet bit to appropriately determine how handle gratuitous and proxy ARPing on behalf of MN 140, and how to forward communications to MN 140. More specifically, if HA 130 determines that MN 140 is on a foreign subnet (i.e., the OnHomeSubnet bit is zero), it may perform its typical role as a home agent, i.e., maintain a binding for MN 140's home address and COA in its binding table, perform proxy ARPing on behalf of MN 140, and tunneling packets to MN 140. If, however, HA 130 determines that MN 140 is on its home subnet (i.e., the OnHomeSubnet bit is set to one), HA 130 may process MN 140's registration request as a special registration request. HA 130 may therefore release the binding for MN 140's home address and COA in its binding table, but not release MN 140's home address. In other words, MN 140 may retain its home address while roaming on its home subnet, but HA 130 may no longer be performing its proxy ARPing and/or IP tunneling functions on behalf of MN 140. Regardless of whether MN 140 is on its home subnet or on a foreign subnet, it may periodically re-register with HA 130 to ensure that it retains its home address.

The following example describes an embodiment of the present invention further. Specifically, the example assumes that MN 140 starts up on its home subnet, roams to a foreign subnet, and then returns to its home subnet. When MN 140 initially starts up on its home subnet, in one embodiment, it may send a registration request to HA 130, with a NAI extension requesting a home address assignment. The registration request may additionally include the OnHomeSubnet bit set to one. Since it is on its home subnet, MN 140 may not acquire and send a COA to HA 130 with this registration request. MN 140 may, for example, utilize broadcast "agent solicitation" messages and receive "agent discovery" messages from HA 130 to discover whether it is on its home subnet. These types of broadcast messages are well known to those of ordinary skill in the art and further description thereof is omitted herein in order not to unnecessarily obscure embodiments of the present invention.

Upon receiving the registration request from MN 140, HA 130 may assign a home address to MN 140 from HA 130's local pool of addresses or acquire a home address for MN 140 from DHCP Server 150. This home address may be returned to MN 140 via a registration reply. Since HA 130 is aware that MN 140 is on its home subnet (because the OnHomeSubnet bit is set to one), HA 130 may not perform any proxy and gratituous ARPing on behalf of MN 140. MN 130 does, however, maintain information for MN 140 in its binding table, and does not release the home address it had assigned to MN 140.

When MN 140 exits its home subnet, it may acquire a COA from DHCP Server 150 (or other COA source), and use this COA and its home address in a registration request to HA 130. Additionally, in the registration request, MN 140 sets the OnHomeSubnet bit to zero, since MN 140 is now on a foreign subnet. When HA 130 receives the registration request, the OnHomeSubnet bit will inform it that MN 140 is on a foreign subnet. HA 130 may therefore create a binding for MN 140 in its binding table and perform typical home agent routing and/or proxy ARPing on behalf of MN 140. HA 130 may continue functioning as a typical home agent for as long as MN 140 continues to roam on foreign subnets.

When MN 140 returns to its home subnet, it may once again set the OnHomeSubnet bit to one. According to one embodiment, instead of deregistering with HA 130 as specified by RFC 2794, MN 140 may instead send another registration request to HA 130. HA 130 may identify from the OnHomeSubnet bit in the registration request that MN 140 is once again on its home subnet. In one embodiment, since MN 140 is on its home subnet and does not require a COA, the COA value in the registration request may be zeroed out. Upon recognizing that MN 140 is on its home subnet, HA 130 may treat this registration request as a special request and instead of releasing the home address assigned to MN 140, it may instead only stop sending proxy and gratuitous ARPs on behalf of MN 140; it will still maintain the binding for MN 140 in its binding table. This effectively stops HA 130 from tunneling packets to MN 140 and performing proxy ARPing, but enables MN 140 to retain its home address while on its home subnet.

Although the above description assumes that MN 140 roams only within Corporate Intranet 100, embodiments of the present invention are not so limited. Embodiments of the present invention may be applicable in any roaming scenarios, e.g., if MN 140 roams across a corporate demilitarized zone ("DMZ") onto an external network. For the purposes of embodiments of the present invention, it is only necessary for HA 130 to determine whether MN 140 is on its home subnet or on a foreign subnet (either within Corporate Intranet 100 or on an external network) Additionally, although the above description assumes that the OnHomeSubnet bit is set to one when MN 140 is on its home subnet, it will be readily apparent to those of ordinary skill in the art that the bits may be reversed (i.e., set to one when MN 140 is on a foreign subnet) without affecting embodiments of the present invention. In such a situation, the OnHomeSubnet bit may zeroed when MN 140 is on its home subnet. Furthermore, it will be apparent to those of ordinary skill in the art that although the above description assumes that Corporate Intranet 100 is a Mobile IPv4 compliant network, embodiments of the present invention are not so limited and may also be implemented on other similar networks with minimal changes.

Figure 2:
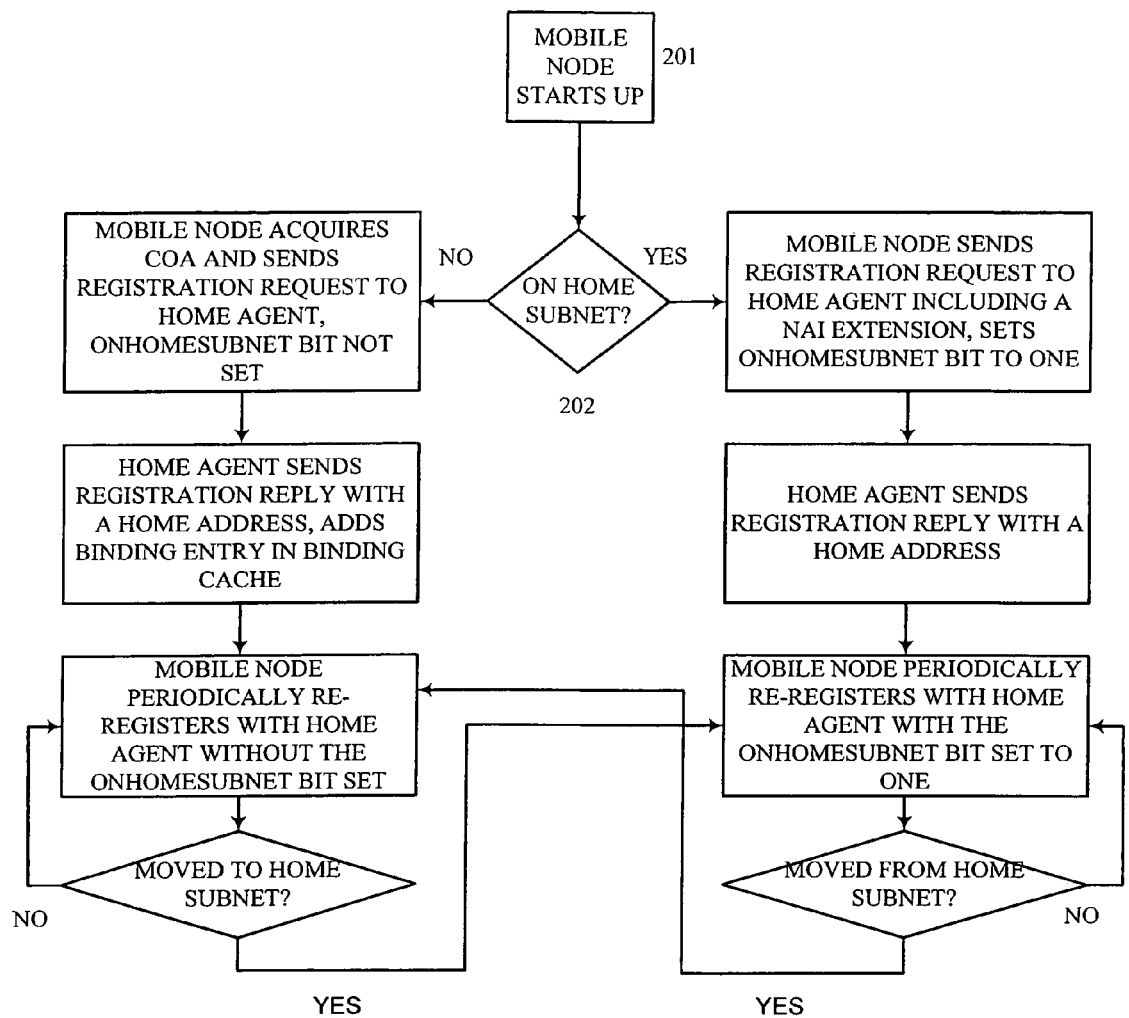
FIG. 2 is a flow chart illustrating an embodiment of the present invention.

FIG. 2 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 201, MN 140 may initially start up and in 202, MN 140 may determine whether it is on its home subnet. If MN 140 determines that it is on its home subnet, in 203, MN 140 may send a registration request to HA 130, including a NAI extension requesting a home address assignment. MN 140 may additionally set the OnHomeSubnet bit in the registration request to one. In 204, HA 130 may send MN 140 a registration reply with a home address (either from a local pool of addresses or an address acquired from a DHCP server). Since HA 130 is aware from the OnHomeSubnet bit that MN 140 is on its home subnet, it may not perform any additional "home agent" type tasks, such as proxy ARPing, gratuitous ARPing and/or IP tunneling. MN 140 may, however, periodically re-register with HA 130 (with the OnHomeSubnet bit set to one) until it identifies that it has moved off its home subnet in 206.

If, however, MN 140 identifies in 202 that it is not on its home subnet, in 207, MN 140 may acquire a COA from a DHCP server, and send a registration request to HA 130 with the COA. In the registration request, MN 140 may also request a home address and leave the OnHomeSubnet bit set to zero. When HA 130 receives the registration request, it may respond with a registration reply in 208. Since HA 130 may determine that MN 140 is on a foreign subnet, it may act as a typical home agent for MN 140 (e.g., creating a binding entry in its binding table and performing gratuitous ARPing and proxy ARPing on behalf of MN 140). In 209, MN 140 may periodically re-register with HA 130 (including the OnHomeSubnet bit left at zero), until it identifies that it has moved back to its home subnet in 206. In 205 and 209, if MN 140 senses that it has moved off or back to its home subnet, it may change the value of the OnHomeSubnet bit and re-register with HA 130. This informs HA 130 that MN 140 moved off or back to its home subnet and HA 130 may behave accordingly.

The mobile nodes and home agents according to embodiments of the present invention may be implemented on a variety of data processing devices. It will be readily apparent to those of ordinary skill in the art that these data processing devices may include various types of software, and may comprise any devices capable of supporting mobile networks, including but not limited to mainframes, workstations, personal computers, laptops, portable handheld computers, PDAs and/or cellular telephones. In an embodiment, mobile nodes may comprise portable data processing systems such as laptops, handheld computing devices, personal digital assistants and/or cellular telephones. According to one embodiment, home agents may comprise data processing devices such as personal computers, workstations and/or mainframe computers. In alternate embodiments, home agents may also comprise portable data processing systems similar to those used to implement mobile nodes.

According to an embodiment of the present invention, data processing devices may include various components capable of executing instructions to accomplish an embodiment of the present invention. For example, the data processing devices may include and/or be coupled to at least one machine-accessible medium. As used in this specification, a "machine" includes, but is not limited to, any data processing device with one or more processors. As used in this specification, a machine-accessible medium includes any mechanism that stores and/or transmits information in any form accessible by a data processing device, the machine-accessible medium including but not limited to, recordable/non-recordable media (such as read only memory (ROM), random access memory (RAM), magnetic disk storage media, optical storage media and flash memory devices), as well as electrical, optical, acoustical or other form of propagated signals (such as carrier waves, infrared signals and digital signals).

According to an embodiment, a data processing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. A host bus controller such as a Universal Serial Bus ("USB") host controller may be coupled to the bus(es) and a plurality of devices may be coupled to the USB. For example, user input devices such as a keyboard and mouse may be included in the data processing device for providing input data.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
setting a bit indicating whether a mobile node is on a home subnet or a foreign subnet;
enabling a mobile device to acquire or retain a home address whether it starts up on the home subnet or the foreign subnet, or whether the mobile device moves between the home subnet and the foreign subnet, wherein the enabling of the mobile device includes requesting the home address from a home agent in a registration request, the registration request including the bit indicating whether the mobile node is on the home subnet or the foreign subnet, wherein if the mobile node is on the foreign subnet; and
receiving a registration reply including the home address to allow the mobile node to roam within a plurality of networks, wherein the mobile node and the home agent are coupled via a network.

2. The method according to claim 1 wherein the bit in the registration request is set to a first predetermined value when the mobile node is on the home subnet and to a second predetermined value when the mobile node is on the foreign subnet.

3. The method according to claim 1 wherein the home agent assigns the home address to the mobile node from at least one of a pool of addresses
maintained by the home agent and a Dynamic Host Control Protocol ("DHCP") server accessible by the home agent.

4. The method according to claim 1 wherein the mobile node roams from the home subnet to the foreign subnet and sends a second registration request to the home agent, the second registration request including the bit set to the second predetermined value.

5. The method according to claim 1 wherein the mobile node roams from the foreign subnet to the home subnet and sends a third registration request to the home agent, the third registration request including the bit set to the first predetermined value.

6. A tangible machine-readable storage medium comprising instructions which, when executed, cause a machine to:
set a bit indicating whether a mobile node is on a home subnet or a foreign subnet;
enable mobile device to acquire or retain a home address whether it starts up on the home subnet or the foreign subnet, or whether the mobile device moves between the home subnet and the foreign subnet, wherein the enabling of the mobile device includes requesting the home address from a home agent in a registration request, the registration request including the bit indicating whether the mobile node is on the home subnet or the foreign subnet, wherein if the mobile node is on the foreign subnet; and
receive a registration reply including the home address to allow the mobile node to roam within a plurality of networks, wherein the mobile node and the home agent are coupled via a network.

7. The tangible machine-readable storage medium according to claim 6 wherein the registration request is set to a first predetermined value when the mobile node is on the home subnet and to a second predetermined value when the mobile node is on the foreign subnet.

8. The tangible machine-readable storage medium according to claim 6 wherein the home agent assigns the home address to the mobile node from at least one of a pool of addresses maintained by the home agent and a Dynamic Host Control Protocol ("DHCP") server accessible by the home agent.

9. The tangible machine-readable storage medium according to claim 6 wherein the mobile node roams from the home subnet to the foreign subnet and sends a second registration request to the home agent, the second registration request including the bit set to the second predetermined value.

10. The tangible machine-readable storage medium according to claim 6 wherein the mobile node roams from the foreign subnet to the home subnet and sends a third registration request to the home agent, the third registration request including the bit set to the first predetermined value.

11. A system comprising:
a bit indicating whether a mobile node is on a home subnet or a foreign subnet, whether the mobile node capable of generating a registration request, the registration request including the bit indicating whether the mobile node is on the home subnet or the foreign subnet; and
a home agent capable of receiving and processing the registration request, the home agent further capable of enabling a mobile device to acquire or retain a home address whether it starts up on the home subnet or the foreign subnet, or whether the mobile device moves between the home subnet and the foreign subnet, wherein the enabling of the mobile device includes assigning the mobile node a home address and sending a registration reply having the home address to the mobile node to allow the mobile node to roam within a plurality of networks, wherein the mobile node and the home agent are coupled via a network, and wherein if the mobile node is on the foreign subnet.

12. The system according to claim 11 wherein the home agent is further capable of generating a binding entry for the mobile node in the binding cache when the bit indicates that the mobile node is on the foreign subnet.

13. The system according to claim 11 wherein home agent is capable of assigning the mobile node the home address from at least one of a pool of addresses maintained by the home agent and a Dynamic Host Control Protocol ("DHCP") server accessible by the home agent.

* * * * *